United States Patent

Kishimoto

[11] Patent Number: 5,821,900
[45] Date of Patent: Oct. 13, 1998

[54] GPS SURVEY INSTRUMENT

[75] Inventor: Hiroshi Kishimoto, Yokohama, Japan

[73] Assignee: Nikon Corporation, Tokyo, Japan

[21] Appl. No.: 854,672

[22] Filed: May 12, 1997

[30] Foreign Application Priority Data

May 27, 1996 [JP] Japan ................................. 8-131777

[51] Int. Cl.⁶ .............................. H04B 7/185; G01S 5/02
[52] U.S. Cl. ............................................ 342/357; 701/216
[58] Field of Search ............................ 342/357; 701/214, 701/216

[56] References Cited

U.S. PATENT DOCUMENTS

| | | | |
|---|---|---|---|
| 5,077,557 | 12/1991 | Ingensand | 342/357 |
| 5,233,357 | 8/1993 | Ingensand et al. | 342/352 |
| 5,379,045 | 1/1995 | Gilbert et al. | 342/357 |
| 5,477,228 | 12/1995 | Tiwari et al. | |
| 5,519,403 | 5/1996 | Bickley et al. | |
| 5,519,620 | 5/1996 | Talbot et al. | |

FOREIGN PATENT DOCUMENTS 4-151509  5/1992  Japan .
4-151510  5/1992  Japan .

Primary Examiner—Theodore M. Blum
Attorney, Agent, or Firm—Pillsbury Madison & Sutro LLP

[57] ABSTRACT

A GPS antenna (11) is removably attached to an electronic survey instrument or station (1). The GPS antenna (11) is positioned away from the mechanical center point (P1) of the station (1). The station (1) has an operation unit that calculates the position (i.e., the GPS coordinates) of the mechanical center point (P1) of the station (1), based on the relative position of the center (P2) of the GPS antenna (11) with respect to the mechanical center (P1) of the station (1), the position of the center (P2) of the GPS antenna (11) obtained by a GPS, and the orientation of the station (10) relative to a reference direction.

4 Claims, 3 Drawing Sheets

GPS SURVEY INSTRUMENT

BACKGROUND

1. Field of the Invention

This invention relates to an electronic survey instrument with a Global Positioning System (GPS) antenna.

2. Related Art

In equipment used to survey and determine the location of a station that cannot adequately receive an electric signal wave for the GPS, use of a station combined with a GPS antenna has been proposed. By doing so, both GPS surveying and measurement taking using the station can be performed. In such survey equipment, the GPS antenna is positioned vertically above the center of the survey instrument. Because the GPS antenna is positioned directly above the station, surveying of an object located above (i.e., in the zenithal direction) and the surroundings thereof cannot be performed.

One objective of the present invention is to provide an electronic survey instrument, provided with a GPS antenna, which can make various types of surveys in the zenithal direction and the surroundings thereof.

Another objective of the present invention is to prevent a GPS antenna from becoming an obstacle when surveying in and around the zenith direction, and to provide an electronic survey instrument with a GPS antenna that can survey the object located in the zenithal direction.

SUMMARY OF THE PRESENT INVENTION

The electronic survey instrument uses a GPS antenna that is detachably mounted to the electronic survey instrument. The GPS antenna is offset from a mechanical center point of the electronic survey instrument. The electronic survey instrument has an operation unit that calculates the coordinates of the center point of the electronic survey instrument in the GPS coordinate system, based on the relative position of the center of the GPS antenna with respect to the center point of the electronic survey instrument, the location of the GPS antenna as identified by the GPS, and the orientation of the electronic survey instrument. Since the location of the mechanical center of the electronic survey instrument can be calculated from the location of the center of the GPS antenna, it is not necessary that the GPS antenna be positioned at a location vertically above the center of the electronic survey instrument.

The electronic survey instrument may have a direction sensor for detecting a reference direction, and/or an azimuth sensor for detecting the orientation of the electronic survey instrument. When these sensors are provided, it is not necessary for the survey instrument to hold data regarding known points.

BRIEF DESCRIPTION OF THE DRAWINGS

Embodiments of the invention will now be described with reference to the accompanying drawings.

DETAILED DESCRIPTION OF THE PREFERRED EMBODIMENTS

Figure 1:
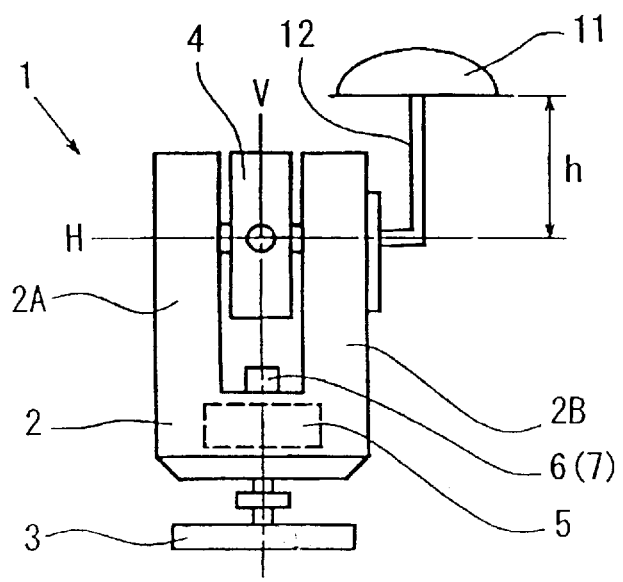
FIG. 1 is a front view of the GPS survey apparatus according to an embodiment of the invention.
Figure 2:
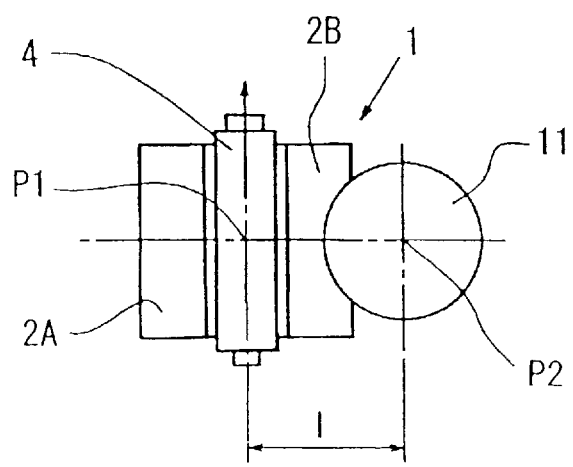
FIG. 2 is a plan view of the survey apparatus of FIG. 1.

FIGS. 1 and 2 show an embodiment of a GPS surveying apparatus according to the present invention. The survey apparatus includes a station 1 and a GPS antenna 11. The structure of the station 1 includes a main body 2 that is rotatable relative to a base 3 that provides horizontal support around a vertical shaft V extending upwardly from the base 3. The base 3 accommodates a first angle sensor 20 for detecting the rotational angle of the station 1 in the horizontal plane relative to base 3. The main body 2 has a pair of upstanding supports 2A and 2B, respectively, that are located on either side of the main body 2. Supports 2A and 2B are spaced apart to define an opening therebetween in which telescopic part 4 is positioned. The telescopic part 4 is pivotable around a horizontal shaft H within a vertical plane. One of the supports 2A or 2B encloses or houses a second angle sensor 22 for detecting the rotational angle of the telescopic part 4 within the vertical plane. The point of intersection of the vertical shaft V and the horizontal shaft H is the mechanical center point P1 of the station 1. The telescopic part 4 comprises a telescope for collimating the target point of the survey, and a range measuring instrument for measuring the distance to the target point. The optical axis T of the telescopic part 4 passes through the mechanical center point P1 of the station 1. The target point may be equipped with, for example, a reflector mounted on a pole or in the form of a corner cube, as necessary. The main body 2 also has a direction sensor 6 for detecting the reference direction of surveying, which is normally north. The direction sensor G includes, for example, a magnetic compass.

The GPS antenna 11 is attached to the station 1 by means of an attachment arm 12 so as to be positioned horizontally above the telescopic part 4 and specifically a distance "h" above the horizontal shaft H, as shown in FIG. 1. Also, the GPS antenna 11 is attached so that when the telescopic part 4 is oriented to the north, the center P2 of the GPS antenna is positioned at a point offset from the optical axis T of the telescopic part by a distance "l" toward the right side of the optical axis T as shown in FIG. 2. The attachment arm 12 and/or any other method for attaching the GPS antenna 11 may be either fixed or removable relative to the support to which it is mounted. If the GPS antenna is removably attached, the relative position of the GPS antenna 11 with respect to the station 1 must be maintained at a constant position. The location of the center P2 of the GPS antenna 11 is easily obtained as coordinates in the GPS coordinate system through surveying techniques using a GPS (referred to as GPS survey).

The main body 2 includes an operation unit 5, such as a microprocessor, which is connected to output signals from the first angle sensor 20 and thereby reads the rotational angle in the horizontal direction detected by the first angle sensor 20 as well as the coordinates of the GPS antenna 11 to which it is also connected, and thereafter calculates the coordinates of the mechanical center point P1 of the station 1 through a predetermined arithmetic operation.

Figure 3:
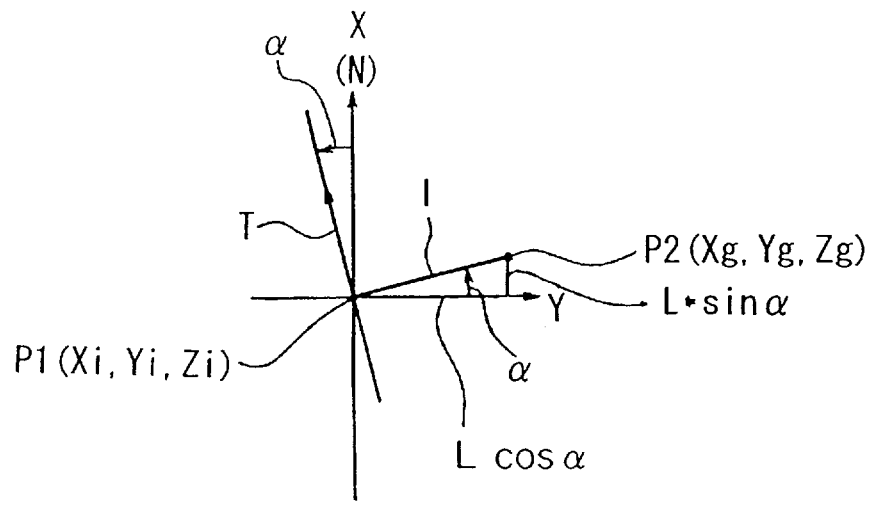
FIG. 3 shows how to obtain the coordinates of the mechanical center of the station using a direction sensor.

The positional relationship between the mechanical center point P1 of the station 1 and the center P2 of the GPS antenna 11 is explained in connection with FIG. 3. In this figure, assuming that the coordinates of the center P2 of the GPS antenna 11 in the GPS coordinate system, as obtained through the GPS survey, are (Xg, Yg, Zg), and that the angle of the optical axis T rotated counterclockwise from the north is, then the coordinates (Xi, Yi, Zi) of the mechanical center point P1 of the station 1 in the GPS system are obtained based on the following equations:

$$Xi = Xg - L^* \sin \alpha$$

$$Yi = Yg - L^* \cos \alpha$$

$$Zi = Zg + h$$

where, "L" and "h" are predetermined values peculiar to the station 1. The angle is calculated by the operation unit 5 reading two detection results or signals of the first angle sensor 20 (one with the telescopic part oriented to the north, and the other with the telescopic part oriented in an arbitrary direction, and then obtaining the difference between the two detected signals). The location of the mechanical center point P1 of the station 1 in the GPS coordinate system can be obtained in this manner, and both GPS surveying and measurement taking using the station 1 can be performed in parallel.

An azimuth sensor 7, which detects the rotational angle from the north, may be used in place of the direction sensor 6. The detection result is read into the operation unit 5 in the same manner to obtain the angle.

Figure 4:
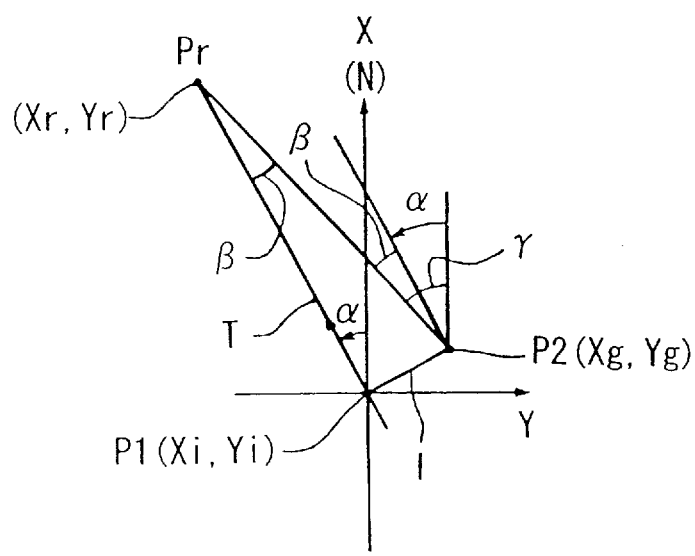
FIG. 4 shows how to obtain the coordinates of the mechanical center of the station using the coordinates of a known point.

Turning to FIG. 4, the angle a may also be calculated from a know point Pr with known GPS coordinates (Xr, Yr), and the coordinates (Xg, Yg) of the GPS antenna center P2. FIG. 4 shows how to calculate the angle when using the known point Pr. The azimuth (i.e., rotational angle from the north) of the point (Xr, Yr) with respect to the point (Xg, Yg), and the angle defined by the line connecting the mechanical center point P1 of the station 1 to the known point Pr and the line connecting the point P2 (Xr, Yr) to the known point Pr (i.e., direction) are expressed by the following equations:

$$\gamma = arc \tan [(Yr-Yg)/(Xr-Xg)]$$

$$\alpha = arc \sin [1/((Yr-Yg)^2 + (Xr-Xg)^2)]$$

Therefore, the angle α is obtained by the following subtraction:

$$\alpha = \gamma - \beta$$

If the GPS antenna 11 is positioned in an arbitrary direction relative to the optical axis T of the telescope, then correction is made to the equations cited above, taking into account the direction of the GPS antenna 11 with regard to the optical axis T of the telescope. This allows the coordinates of the mechanical center point P1 of the station 1 to be accurately calculated from the coordinates of the center P2 of the GPS antenna 11.

Figure 5:
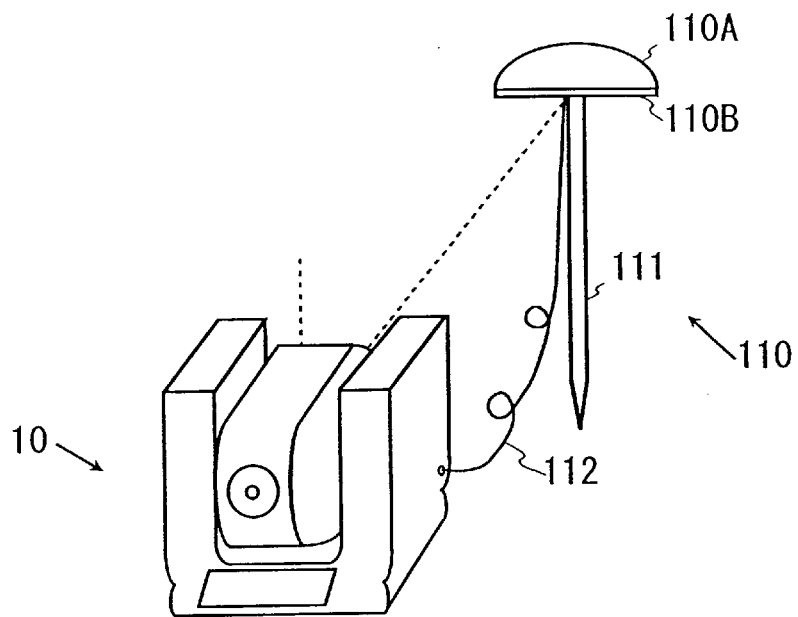
FIG. 5 is a perspective view of the GPS survey apparatus according to another embodiment.
Figure 6:
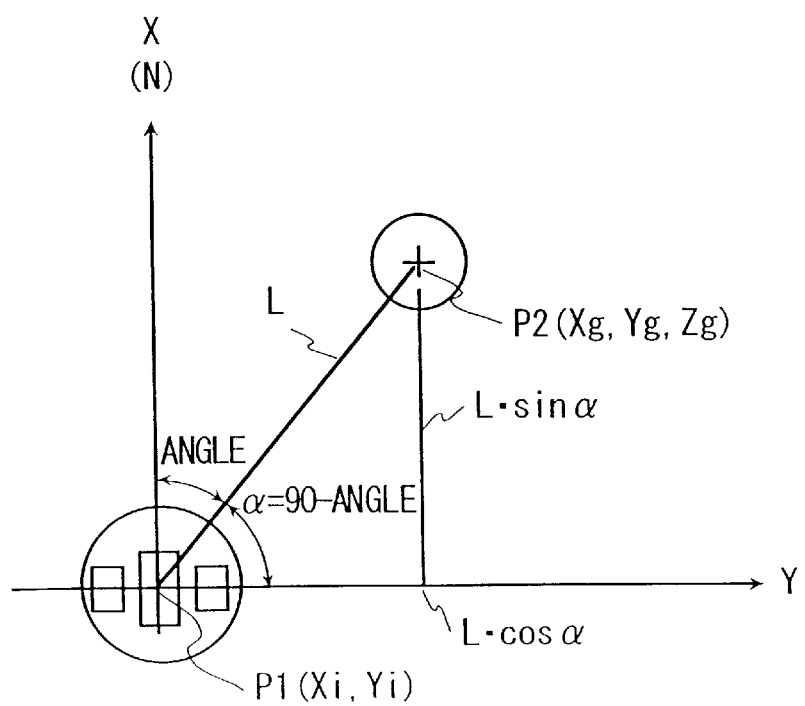
FIG. 6 shows how to obtain the coordinates of the mechanical center of the station using the apparatus of FIG. 5.

FIG. 5 shows GPS surveying apparatus according to another embodiment. In this embodiment, the GPS antenna 110 is placed on an antenna pole 111 at a location spaced apart from the station 10. The station 10 is the same as the station 1 of the previous embodiment, and has a direction sensor 114 for detecting the reference direction of the survey (e.g., the north).

The GPS antenna 110 is connected to the station 10 by cable 112, so that the coordinates of the center of the GPS antenna 110 in the GPS coordinate system, detected by the GPS antenna 110, are supplied to the station 10 through the cable 112.

In this embodiment, the station 10 calculates the direction and the distance of the GPS antenna 110 with respect to the station 10. More particularly, a collimation reference mark 110B is provided, as a horizontal base line, on a hemispherical antenna cover 110A to obtain the horizontal and vertical angles of the reference mark 110B relative to the station 10, as well as the distance between the reference mark 110B and the station 10. The relative position of the collimation reference mark 110B with respect to the center of the GPS antenna 110 is known, and expressed with a vertical distance (i.e., the height) and a horizontal distance (radius).

Based on the horizontal angle obtained by the station 10 and the output from the direction sensor 114, the azimuth of the GPS antenna with respect to the station 10 can be calculated. Furthermore, based on the calculated azimuth, the distance from the GPS antenna 110, the GPS coordinates of the GPS antenna 110 supplied to the station 10 through the cable 112, and the relative position between the collimation reference mark 110B and the center of the GPS antenna 110, the coordinates of the mechanical center point of the station 10 in the GPS coordinate system can be calculated, while making a correction to the equations used in the first embodiment by taking into account the positional relation between the collimation reference mark 110B and the center of the GPS antenna 110. In this case, however, the angle α is defined as an angle obtained by subtracting the azimuth (i.e., angle from the north in the counterclockwise direction) of the GPS antenna 110 with respect to the station 10 from 90°.

Because the GPS antenna is positioned away, and not directly above the survey instrument, survey targeting the object located in the zenith and its surrounding directions is suitably performed.

What is claimed is:

1. An electronic survey instrument comprising:
    a GPS antenna, which is detachably attached to the electronic survey instrument, wherein when the GPS antenna is attached to the electronic survey instrument, it is positioned so as to be offset from a mechanical center point of the electronic survey instrument; and
    an operation unit that calculates the location of the mechanical center point of the electronic survey instrument based on a position of the GPS antenna relative to the mechanical center point of the electronic survey instrument, the location of a center of the GPS antenna as identified by a GPS, and the orientation of the electronic survey instrument with respect to a reference direction.

2. The electronic survey instrument according to claim 1, further comprising a direction sensor that detects the reference direction.

3. The electronic survey instrument according to claim 1, further comprising an azimuth sensor that detects the orientation of the electronic survey instrument.

4. A GPS survey apparatus comprising:
    a GPS antenna; and
    an electronic survey instrument, which is connected to the GPS antenna via a cable, the electronic survey instrument including:
        an azimuth sensor for detecting a reference direction, and
        an operation unit for calculating a location of a mechanical center point of the electronic survey instrument based on a position of the GPS antenna relative to the electronic survey instrument, the location of the center of the GPS antenna as identified by a GPS, and the orientation of the GPS antenna relative to the reference direction.

* * * * *